United States Patent
Ahn et al.

(10) Patent No.: US 10,154,426 B2
(45) Date of Patent: Dec. 11, 2018

(54) METHOD FOR PERFORMING MEASUREMENT AND DEVICE USING SAME

(71) Applicant: LG ELECTRONICS INC., Seoul (KR)

(72) Inventors: Joonkui Ahn, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 89 days.

(21) Appl. No.: 15/311,048

(22) PCT Filed: May 22, 2015

(86) PCT No.: PCT/KR2015/005151
§ 371 (c)(1),
(2) Date: Nov. 14, 2016

(87) PCT Pub. No.: WO2015/178720
PCT Pub. Date: Nov. 26, 2015

(65) Prior Publication Data
US 2017/0086085 A1   Mar. 23, 2017

Related U.S. Application Data

(60) Provisional application No. 62/002,132, filed on May 22, 2014.

(51) Int. Cl.
*H04W 24/08* (2009.01)
*H04L 5/00* (2006.01)
(Continued)

(52) U.S. Cl.
CPC ........... *H04W 24/08* (2013.01); *H04L 5/0048* (2013.01); *H04W 24/10* (2013.01); *H04W 48/16* (2013.01); *H04W 48/20* (2013.01)

(58) Field of Classification Search
CPC ..... H04L 5/0048; H04L 5/005; H04L 5/0053; H04L 5/0057; H04W 24/08; H04W 24/10;
(Continued)

(56) References Cited

U.S. PATENT DOCUMENTS

2010/0097937 A1   4/2010   Pietraski et al.
2010/0323709 A1   12/2010  Nam et al.
(Continued)

FOREIGN PATENT DOCUMENTS

KR   10-2010-0066261 A   6/2010
KR   10-2012-0038442 A   4/2012
(Continued)

OTHER PUBLICATIONS

MediaTek Inc., "Performance comparison of small cell discovery signal designs", Feb. 10-14, 2014, 3GPP TSG-RAN WG1 #76, R1-140246, pp. 1-7 (Year: 2014).*

*Primary Examiner* — Paul H Masur
(74) *Attorney, Agent, or Firm* — Birch, Stewart, Kolasch & Birch, LLP

(57) ABSTRACT

Provided are a method for performing measurement in a wireless communication system and a device using the same. The device receives a discovery reference signal (DRS) in a subframe designated from a target cell, and performs a measurement on the basis of the DRS. An antenna port of the DRS is determined from antenna ports of a cell-specific reference signal (CRS) transmitted by the target cell.

10 Claims, 6 Drawing Sheets

(51) Int. Cl.
*H04W 24/10* (2009.01)
*H04W 48/16* (2009.01)
*H04W 48/20* (2009.01)

(58) Field of Classification Search
CPC ... H04W 48/16; H04W 48/20; H04W 72/044; H04W 72/0446; H04W 72/04; H04W 72/042
See application file for complete search history.

(56) References Cited

U.S. PATENT DOCUMENTS

| | | | |
|---|---|---|---|
| 2011/0228718 A1 | 9/2011 | Noh et al. | |
| 2014/0293943 A1 | 10/2014 | Yoon | |
| 2014/0301301 A1* | 10/2014 | Cheng | H04L 5/0048 370/329 |
| 2014/0314000 A1* | 10/2014 | Liu | H04W 72/042 370/329 |
| 2015/0092582 A1* | 4/2015 | Liao | H04J 11/005 370/252 |
| 2015/0181543 A1 | 6/2015 | Hwang et al. | |
| 2015/0223149 A1* | 8/2015 | Liu | H04W 48/12 370/252 |
| 2017/0064571 A1* | 3/2017 | Kusashima | H04W 24/10 |
| 2017/0064576 A1* | 3/2017 | Kusashima | H04W 48/16 |
| 2017/0078903 A1* | 3/2017 | Kusashima | H04W 24/10 |
| 2017/0105112 A1* | 4/2017 | Park | H04W 8/005 |

FOREIGN PATENT DOCUMENTS

| | | |
|---|---|---|
| KR | 10-2013-0038394 A | 4/2013 |
| KR | 10-2013-0040459 A | 4/2013 |
| WO | WO 2014/017765 A1 | 1/2014 |

* cited by examiner

METHOD FOR PERFORMING MEASUREMENT AND DEVICE USING SAME

CROSS REFERENCE TO RELATED APPLICATIONS

This application is the National Phase of PCT International Application No. PCT/KR2015/005151, filed on May 22, 2015, which claims priority under 35 U.S.C. 119(e) to U.S. Provisional Application No. 62/002,132, filed on May 22, 2014, all of which are hereby expressly incorporated by reference into the present application.

BACKGROUND OF THE INVENTION

Field of the Invention

The present invention relates to wireless communication, and more particularly, to a method of performing a measurement in a wireless communication system, and a device using the method.

Related Art

With the advancement of mobile technologies, a usage amount of data traffic is rapidly increased. In order for the data traffic to be processed much faster and with more amount by using a limited radio resource, a standardization task and a technology development are underway in several aspects. A representative example thereof may include three dimensional (3D) beam forming, massive multiple input multiple output (MIMO), a heterogeneous network, a small cell, or the like.

To satisfy various user demands and an increased amount of data, various cells are introduced. In addition to a typical cell having fixed coverage at a fixed location, cells for providing mobility and a variety of coverage are introduced.

A cell selection is a process in which a user selects a cell for providing a service to the user. The cell selection requires a collection of measurement results for neighboring cells. The user measures signal quality of the neighboring cell, and attempts to connect to a cell most suitable for the user.

There is a need for a method of performing a cell measurement for various types of cells.

SUMMARY OF THE INVENTION

The present invention provides a method of performing a measurement in a wireless communication system for data offloading.

In an aspect, a method of performing a measurement in a wireless communication system is provided. The method includes receiving, by a wireless device, a discovery reference signal (DRS) in a subframe designated by a target cell, and performing, by the wireless device, the measurement based on the DRS. An antenna port of the DRS is determined from an antenna port of a cell-specific reference signal (CRS) transmitted by the target cell.

A number of antenna ports of the DRS may be less than or equal to a number of antenna ports of the CRS.

The antenna port of the DRS may be the same as at least any one of antenna ports of the CRS.

In another aspect, a device for performing a measurement in a wireless communication system includes a transceiver configured to transmit and receive a radio signal, and a processor operatively coupled to the transceiver. The processor is configured to receive a discovery reference signal (DRS) in a subframe designated by a target cell, and perform the measurement based on the DRS. An antenna port of the DRS is determined from an antenna port of a cell-specific reference signal (CRS) transmitted by the target cell.

A method of performing a cell measurement for data offloading is provided. A reference signal is used to reduce an erroneous measurement of signal quality.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

It is described hereinafter that the present invention is applied based on 3rd generation partnership project (3GPP) long term evolution (LTE) based on 3GPP Technical Specification (TS). This is for exemplary purposes only, and the present invention is also applicable to various wireless communication systems.

Figure 1:
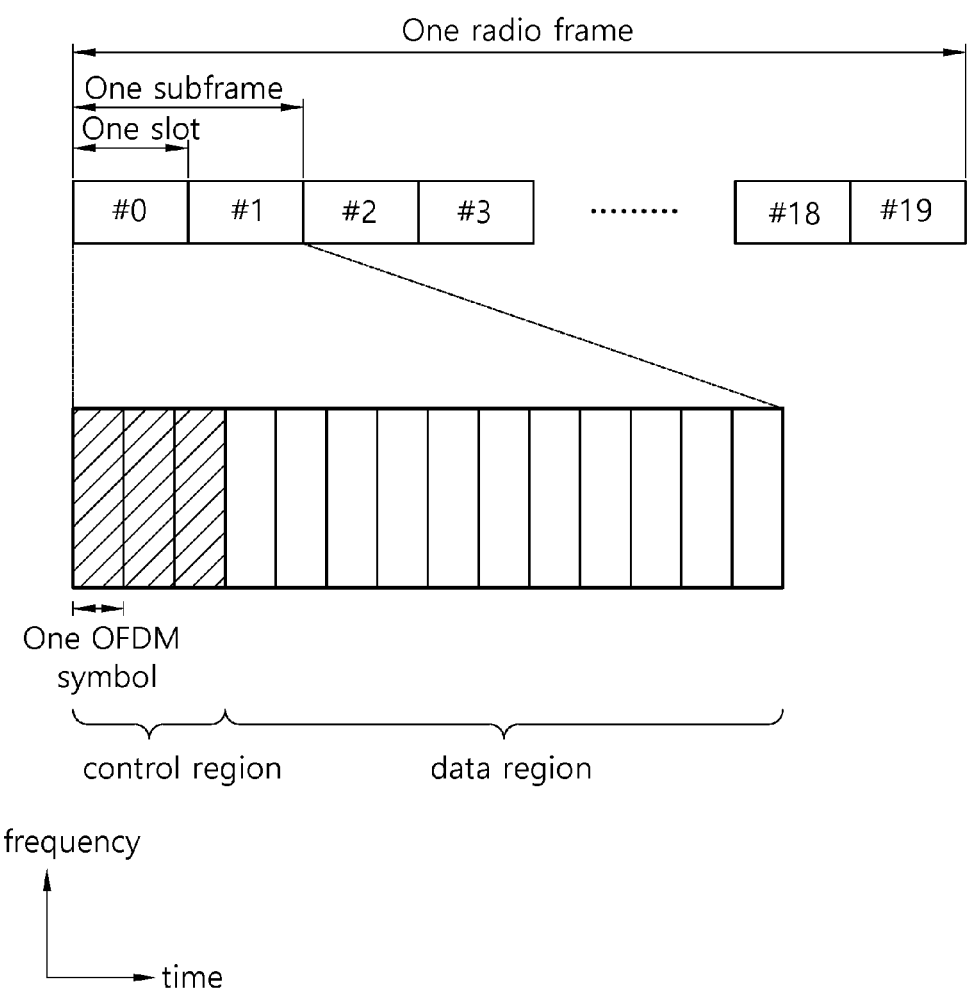
FIG. 1 shows a structure of a downlink radio frame in $3^{rd}$ generation partnership project (3GPP) long term evolution (LTE).

FIG. 1 shows a structure of a downlink radio frame in 3GPP LTE. The section 6 of 3GPP TS 36.211 V8.7.0 (2009 May) "Evolved Universal Terrestrial Radio Access (E-UTRA); Physical Channels and Modulation (Release 8)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A downlink (DL) subframe is divided into a control region and a data region in the time domain. The control region includes up to first four OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical control channel into a data channel and a control channel. The data channel includes a Physical Downlink Shared Channel (PDSCH) and a Physical Uplink Shared Channel (PUSCH). The control channel includes a Physical Downlink Control Channel (PDCCH), a Physical Control Format Indicator Channel (PCFICH), a Physical Hybrid-ARQ Indicator Channel (PHICH) and a Physical Uplink Control Channel (PUCCH).

In order to facilitate channel demodulations and channel measurements, various reference signals are provided. A cell-specific reference signal (CRS) is transmitted over an overall downlink bandwidth and can be received by all wireless devices in a cell. A UE-specific reference signal (URS) is transmitted over a data region of a subframe and can be used for a PDSCH demodulation. A channel status information-reference signal (CSI-RS) is used to mitigate inter-cell interference under multi-cell environment.

Figure 2:
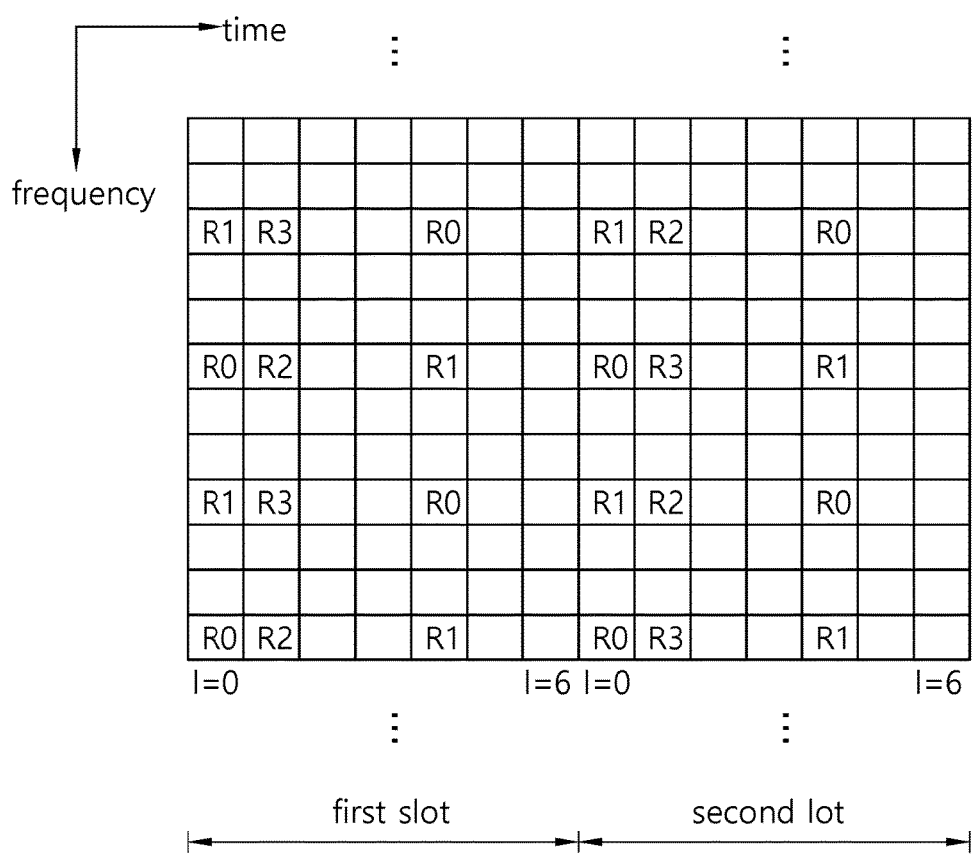
FIG. 2 shows an example of arranging a reference signal in a downlink (DL) subframe of 3GPP LTE.

FIG. 2 shows an example of arranging a reference signal in a DL subframe of 3GPP LTE.

A CRS is transmitted over an overall DL bandwidth and can be received by all wireless devices in a cell. 'R0' denotes a resource element (RE) in which a CRS corresponding to a first antenna port is transmitted. 'R1' denotes an RE in which a CRS corresponding to a second antenna port is transmitted. 'R2' denotes an RE in which a CRS corresponding to a third antenna port is transmitted. 'R3' denotes an RE in which a CRS corresponding to a fourth antenna port is transmitted.

A RS sequence for the CRS may be defined as follows.

$$r_{l,ns}(m) = \frac{1}{\sqrt{2}}(1-2\cdot c(2m)) + j\frac{1}{\sqrt{2}}(1-2\cdot c(2m+1)) \quad \text{[Equation 1]}$$

Herein, $m=0, 1, \ldots, 2N_{maxRB}-1$, and $N_{maxRB}$ is the maximum number of RBs, ns is a slot number in a radio frame and l is a OFDM symbol number in a slot.

A pseudo-random sequence c(i) may be defined by a gold sequence having a length of 31 as follows.

$c(n)=(x_1(n+Nc)+x_2(n+Nc))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ [Equation 2]

Herein, Nc is 16000, and the first m-sequence is initialized as $x_1(0)=1, x_1(n)=0, m=1, 2, \ldots, 30$.

A second m-sequence is initialized as $c_{init}=2^{10}(7(ns+1)+l+1)(2N^{cell}_{ID}+1)+2\,N^{cell}_{ID}+N_{CP}$ at a start of each OFDM symbol. $N^{cell}_{ID}$ is a physical cell identity. $N_{CP}=1$ for normal CP and $N_{CP}=0$ for extended CP.

The CRS is used to measure a cell quality and to demodulated PDCCH/PDSCH. The cell quality may include at least one of a reference signal received power (RSRP) and a reference signal received quality (RSRQ).

Figure 3:
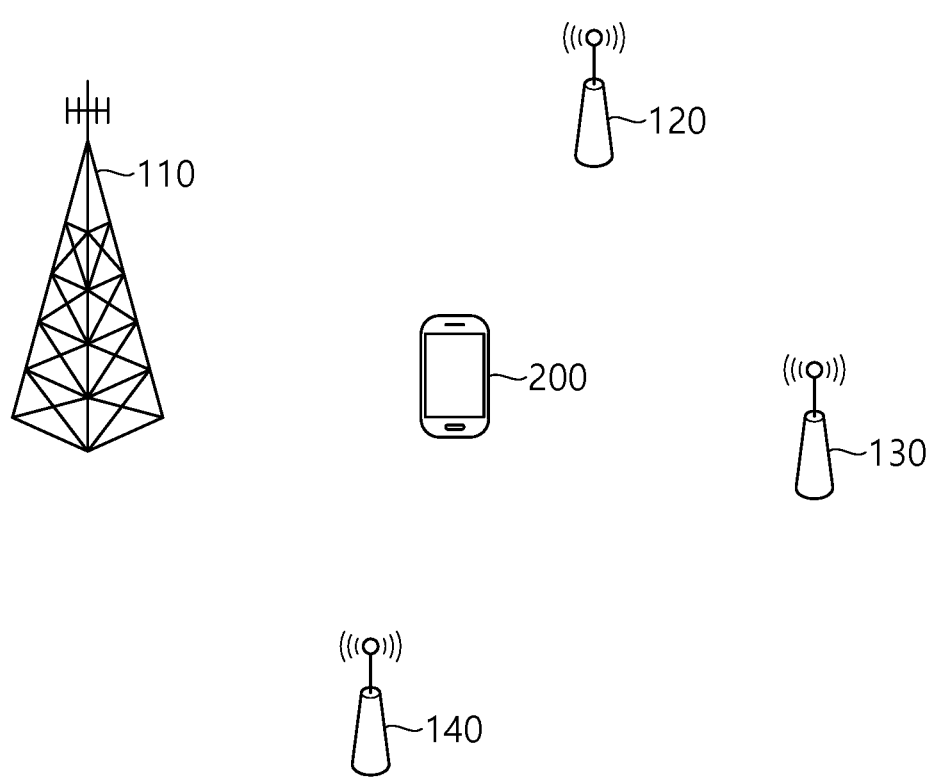
FIG. 3 shows an example of arranging a plurality of cells.

FIG. 3 shows an example of arranging a plurality of cells.

A wireless device 200, a 1$^{st}$ small cell 120, a 2$^{nd}$ small cell 130, and a 3$^{rd}$ small cell 140 are present in coverage of a macro cell 110. The number of small cells and locations thereof are for exemplary purposes only. The macro cell 110, the 1$^{st}$ small cell 120, the 2$^{nd}$ small cell 130, and the 3$^{rd}$ small cell 140 may be served by one BS, or may be served by different BSs. The cell may also be called a communication node.

As a primary cell, the macro cell 110 may be connected by the wireless device 200. This is for exemplary purposes only, and thus the primary cell may be the other cells 120, 130, and 140. The primary cell may provide the wireless device 200 with information (e.g., frequency information, cell index) for operating at least one of the remaining cells 120, 130, and 140 as a secondary cell. The secondary cell may be activated or deactivated according to an instruction of the primary cell.

The macro cell 110 may utilize at least one of the small cells 120, 130, and 140 in data offloading for the wireless device 200. The macro cell 110 may select a cell suitable for the data offloading among the small cells 120, 130, and 140, and thus assigns the cell to the wireless device 200 as an offloading cell. The offloading cell may be the secondary cell.

The offloading cell needs to consider a low load or the number of accessed users in terms of a cell management, rather than simply considering only signal quality such as RSRP or RSRQ.

Therefore, a measurement for determining the offloading cell needs to: 1) detect a cell within a relatively short time; 2) perform the measurement within a relatively short time; and 3) consider an on/off operation of a cell, in addition to signal quality based on the existing CRS.

In order for the wireless device 200 to more effectively detect the offloading cells, each cell may additionally transmit a discovery reference signal (DRS) in addition to the CRS.

For clarity, the DRS may be defined as an RS sequence of Equation 1. A pseudo-random sequence c(i) may be initialized on the basis of a virtual identifier and/or a cell index for transmitting the DRS. Information regarding the virtual identifier may be given by the primary cell. A location of an RE in which the DRS is transmitted may be the same as a location of an RE in which the CRS is transmitted.

The CRS is transmitted in every subframe when the cell is in an on state, but is not transmitted when the cell is in an off state. The DRS may be transmitted in a designated duration (or a designated subframe) irrespective of whether the cell is in the on/off state.

If the wireless device 200 cannot know whether a CRS of a corresponding neighboring cell is off when intending to detect a DRS of neighboring cells, there may be a problem in a measurement result due to a difference between a CRS-based measurement and a DRS-based measurement.

More specifically, in the existing LTE system, the RSPR is measured on the basis of a CRS of an antenna port 0 as to a cell in which the CRS is not off. In addition, if the wireless device 200 detects a CRS of an antenna port 1 in a reliable manner, the CRS of the antenna port 1 is also used to increase RSPR measurement performance.

However, if any cell transmits a DRS through the antenna port 0 and transmits a CRS through the antenna ports 0 and 1, the wireless device can know that a corresponding cell uses the antenna ports 0 and 1 through the CRS, but cannot know which antenna port is used for the DRS. If the wireless device 200 performs an RSRP measurement under the assumption that the DRS also uses the antenna ports 0 and 1, measurement performance may deteriorate.

Figure 4:
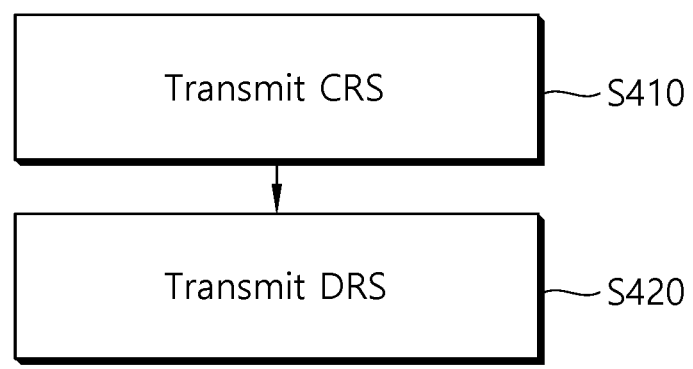
FIG. 4 shows reference signal transmission according to an embodiment of the present invention.

FIG. 4 shows reference signal transmission according to an embodiment of the present invention. This may be performed by a target cell. The target cell may be a primary cell or a secondary cell. The target cell may be an activated secondary cell or a deactivated secondary cell. To activate the secondary cell, the target cell may be limited to the deactivated secondary cell. Alternatively, the target cell may be not a serving cell but a neighboring cell from a perspective of the wireless device.

In step S410, the target cell transmits a CRS. Information regarding an antenna port of the CRS transmitted by the target cell may be reported by the primary cell or the target cell to the wireless device.

In step S420, the target cell transmits a DRS. Information regarding a duration in which the DRS is transmitted may be reported by the primary cell or the target cell to the wireless device.

The antenna port through which the DRS is transmitted may be determined as follows.

In one embodiment, the antenna port through which the DRS is transmitted may be determined on the basis of the antenna port through which the CRS is transmitted. If the CRS uses only an antenna port 0, the DRS may also use only the antenna port 0. If the CRS uses the antenna port 0, 1, or higher than that, the DRS may use the antenna ports 0 and 1.

If the target cell transmits the CRS only through the antenna port 0, the wireless device may perform a measurement under the assumption that the DRS of the target cell is also transmitted only through the antenna port 0. If the target cell transmits the CRS only through the antenna ports 0 and 1, the wireless device may perform a measurement under the assumption that the DRS of the target cell is also transmitted through the antenna ports 0 and 1.

Without additional information regarding the antenna port of the DRS, the wireless device may determine the antenna port of the DRS, and may prevent an erroneous measurement of the DRS.

If the CRS is transmitted through N antenna ports (where N>=1), the DRS may be transmitted through N or less antenna ports. The wireless device may perform a measurement under the assumption that the number of antenna ports through which the DRS is transmitted is less than or equal to the number of antenna ports of the CRS.

In another embodiment, the antenna port of the DRS may be limited to a specific antenna port (e.g., an antenna port 0). If the wireless device does not know information regarding the number of antenna ports of the CRS of the target cell which is a target of a DRS measurement, the antenna port of the DRS may be limited to the antenna port 0.

If the number of antenna ports through which the CRS is transmitted is not determined, it may be assumed that the DRS is transmitted with the minimum number of antenna ports.

The above method may also be applied to any reference signal (CSI-RS, positional reference signal (PRS), etc.) of a cell for transmitting not only the CRS but also the DRS.

Figure 5:
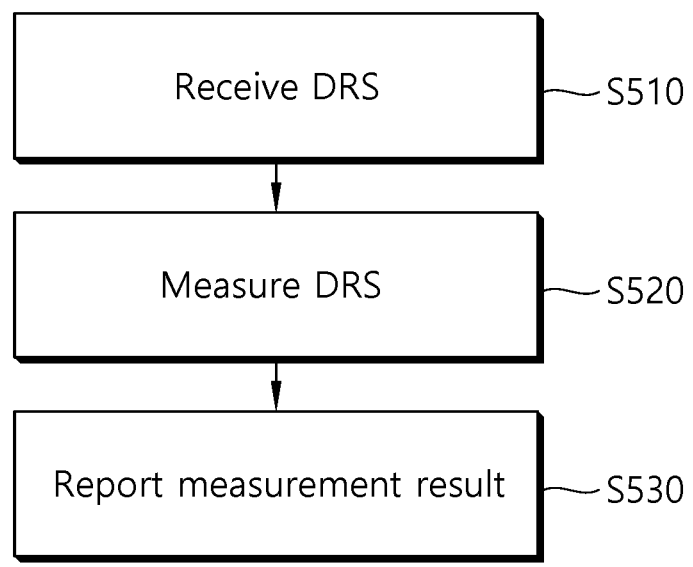
FIG. 5 shows a measurement performed by using a reference signal according to an embodiment of the present invention.

FIG. 5 shows a measurement performed by using a reference signal according to an embodiment of the present invention.

In step S510, a wireless device receives a DRS from the aforementioned target cell in a designated frame. The target cell may be an inactivated secondary cell. The wireless device may also receive a CRS from the target cell in every subframe. One or more of a plurality of subframes in a radio frame may be used to receive the DRS. Information regarding the subframe for DRS reception may be given by a primary cell.

An antenna port for receiving the DRS may be determined on the basis of an antenna port of the CRS as described in the above embodiment, or may be predetermined.

In step S520, the wireless device performs a measurement on the basis of the received DRS.

In step S530, the wireless device may report a measurement result to the primary cell or another serving cell.

Figure 6:
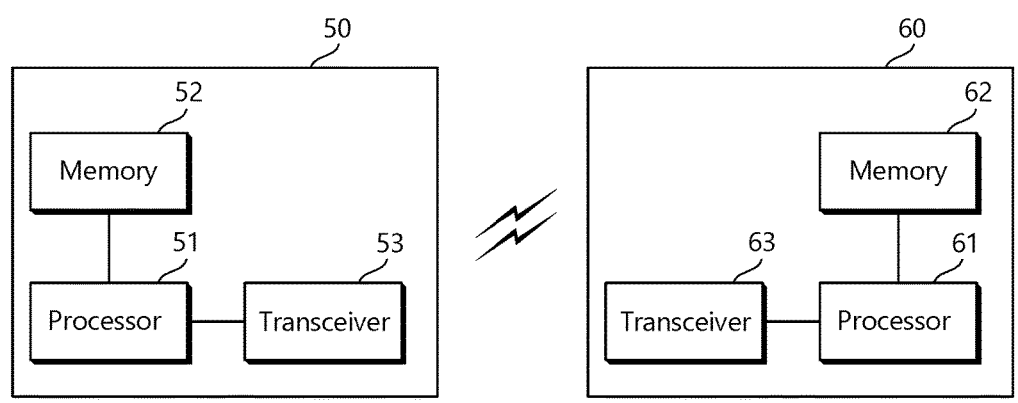
FIG. 6 is a block diagram showing a wireless communication system for which an embodiment of the present invention is implemented.

FIG. 6 is a block diagram showing a wireless communication system for which an embodiment of the present invention is implemented.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the wireless device may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may corresponds to a primary cell or a secondary cell. Alternatively, the BS 60 may correspond to a cell for transmitting a CRS/DRS. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of each cell may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing a measurement on a channel quality in a wireless communication system, the method comprising:
receiving, by a wireless device, a discovery reference signal (DRS) in a subframe designated by a target cell, and
performing, by the wireless device, the measurement on the channel quality based on the DRS,
wherein the DRS is transmitted through an antenna port 0 if a cell-specific reference signal (CRS) is transmitted through the antenna port 0 by the target cell, and
wherein the DRS is transmitted through the antenna port 0 and an antenna port 1 if the CRS is transmitted through at least the antenna port 0 and the antenna port 1 by the target cell.

2. The method of claim 1, wherein a number of antenna ports of the DRS is less than or equal to a number of antenna ports of the CRS.

3. The method of claim 2, wherein an antenna port of the DRS is the same as at least any one of antenna ports of the CRS.

4. The method of claim 1, wherein the DRS is received at the same location as the CRS.

5. The method of claim 1, wherein the target cell is a deactivated secondary cell.

6. The method of claim 1, further comprising:
receiving, by the wireless device, information regarding the designated subframe to receive the DRS.

7. The method of claim 1, further comprising:
receiving, by the wireless device, information regarding an antenna port of the CRS.

8. A device for performing a measurement on a channel quality in a wireless communication system, the device comprising:
a transceiver configured to transmit and receive a radio signal; and
a processor operatively coupled to the transceiver and configured to:
control the transceiver to receive a discovery reference signal (DRS) in a subframe designated by a target cell, and
perform the measurement on the channel quality based on the DRS,
wherein the DRS is transmitted through an antenna port 0 if a cell-specific reference signal (CRS) is transmitted through the antenna port 0 by the target cell, and
wherein the DRS is transmitted through the antenna port 0 and an antenna port 1 if the CRS is transmitted through at least the antenna port 0 and the antenna port 1 by the target cell.

9. The device of claim 8, wherein a number of antenna ports of the DRS is less than or equal to a number of antenna ports of the CRS.

10. The device of claim 9, wherein an antenna port of the DRS is the same as at least any one of antenna ports of the CRS.

* * * * *